US012602462B2

(12) United States Patent
Williams et al.

(10) Patent No.: US 12,602,462 B2
(45) Date of Patent: Apr. 14, 2026

(54) ARTIFICIAL-INTELLIGENCE-ENABLED AUTHENTICATION BASED ON USER METADATA

(71) Applicant: MASTERCARD TECHNOLOGIES CANADA ULC, Vancouver (CA)

(72) Inventors: Kyle Williams, Wentzville, MO (US); Jonathan McGrandle, Maple Ridge (CA); Matthew Melnik, Delta (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 49 days.

(21) Appl. No.: 18/490,031

(22) Filed: Oct. 19, 2023

(65) Prior Publication Data

US 2025/0131076 A1      Apr. 24, 2025

(51) Int. Cl.
| | |
|---|---|
| *G06F 21/32* | (2013.01) |
| *G06F 21/45* | (2013.01) |
| *G06N 5/022* | (2023.01) |
| *G06F 21/44* | (2013.01) |
| *G06F 21/62* | (2013.01) |

(52) U.S. Cl.
CPC ............. *G06F 21/32* (2013.01); *G06N 5/022* (2013.01); *G06F 2221/2131* (2013.01)

(58) Field of Classification Search
None
See application file for complete search history.

(56) References Cited

U.S. PATENT DOCUMENTS

| | | | |
|---|---|---|---|
| 8,134,449 B2 * | 3/2012 | Wu, Jr. ................... | G06F 21/31 |
| | | | 707/603 |
| 9,400,879 B2 * | 7/2016 | Tredoux ................ | G06F 21/316 |

(Continued)

FOREIGN PATENT DOCUMENTS

EP          2477136 A1      7/2012

OTHER PUBLICATIONS

E-Commerce Authentication Security with AI: Advanced Biometric and Behavioral Recognition for Secure Access Control. Aisyah. QuestSquare. (Year: 2021).*

(Continued)

*Primary Examiner* — Venkat Perungavoor
(74) *Attorney, Agent, or Firm* — Michael Best & Friedrich LLP

(57)          ABSTRACT
A system includes memory hardware configured to store instructions and one or more electronic processors configured to execute the instructions. The instructions include logging historical behavioral biometric metadata from one or more computing platforms, generating a user profile based on the logged historical behavioral biometric metadata, receiving an authentication request from a client computing platform, providing the first behavioral biometric metadata and the user profile to a trained machine learning model to generate a biometric match, generating a positive control signal in response to a positive biometric match, sending the positive control signal to the client computing platform, updating the historical behavioral biometric metadata with the first behavioral biometric metadata, and retraining the trained machine learning model using the updated historical behavioral biometric metadata. The authentication request includes first behavioral biometric metadata.

13 Claims, 14 Drawing Sheets

300

302 — Log behavioral biometric metadata from a user interacting with a graphical user interface 304 — Generate a training dataset from the logged behavioral biometric metadata 306 — Train a machine learning model using the training dataset

(56)    References Cited

U.S. PATENT DOCUMENTS

| | | | | |
|---|---|---|---|---|
| 2006/0195328 | A1* | 8/2006 | Abraham | G06Q 30/02 |
| | | | | 235/382 |
| 2009/0134972 | A1 | 5/2009 | Wu et al. | |
| 2015/0363785 | A1 | 12/2015 | Perez et al. | |
| 2017/0068958 | A1 | 3/2017 | Oberheide et al. | |
| 2019/0121956 | A1 | 4/2019 | Turgeman | |
| 2020/0259657 | A1* | 8/2020 | Grajek | G06F 21/32 |
| 2021/0336952 | A1 | 10/2021 | Margolin et al. | |
| 2022/0103548 | A1 | 3/2022 | McGee et al. | |
| 2022/0210151 | A1 | 6/2022 | Williams et al. | |
| 2023/0051980 | A1 | 2/2023 | Tammannagari et al. | |
| 2023/0206233 | A1 | 6/2023 | Aument et al. | |
| 2023/0385422 | A1* | 11/2023 | Chandrasekar | G06F 21/577 |
| 2024/0031367 | A1* | 1/2024 | Pringle | H04L 63/10 |
| 2024/0281474 | A1 | 8/2024 | Craft | |
| 2024/0311831 | A1* | 9/2024 | Kwok | G06Q 20/40145 |
| 2025/0005121 | A1* | 1/2025 | Cliche | G06F 21/316 |
| 2025/0060863 | A1* | 2/2025 | Sniffen | G06F 9/543 |
| 2025/0131076 | A1* | 4/2025 | Williams | G06F 21/45 |

OTHER PUBLICATIONS

Keystroke Dynamics User Authentication Using Advanced Machine Learning Methods. Deng. (Year: 2015).*

A Concept of Social Behavioral Biometrics: Motivation, Current Developments, and Future Trends. Sultana. IEEE. (Year: 2014).*

International Search Report and Written Opinion for Application No. PCT/CA2024/051188 dated Dec. 13, 2024 (11 pages).

U.S. Appl. No. 18/490,023, filed Oct. 19, 2023, by Williams et al. issued by the Office on Oct. 19, 2004).

International Search Report and Written Opinion for Application No. PCT/CA2024/051190 dated Nov. 22, 2024 (15 pages).

* cited by examiner

300

302 — Log behavioral biometric metadata from a user interacting with a graphical user interface 304 — Generate a training dataset from the logged behavioral biometric metadata 306 — Train a machine learning model using the training dataset

400

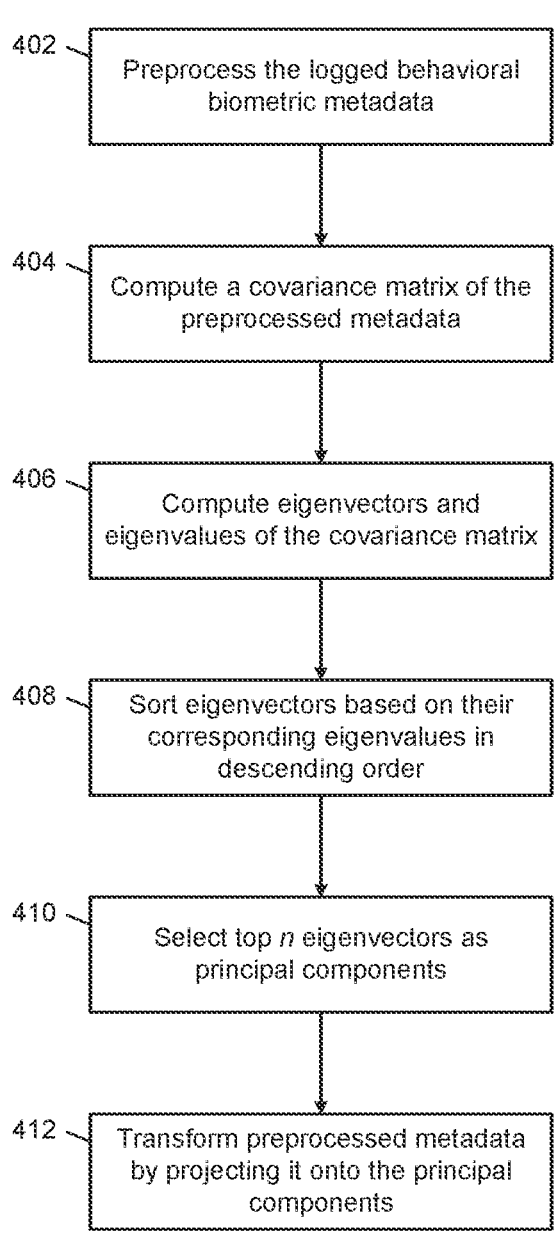

402 — Preprocess the logged behavioral biometric metadata

404 — Compute a covariance matrix of the preprocessed metadata

406 — Compute eigenvectors and eigenvalues of the covariance matrix

408 — Sort eigenvectors based on their corresponding eigenvalues in descending order 410 — Select top *n* eigenvectors as principal components 412 — Transform preprocessed metadata by projecting it onto the principal components

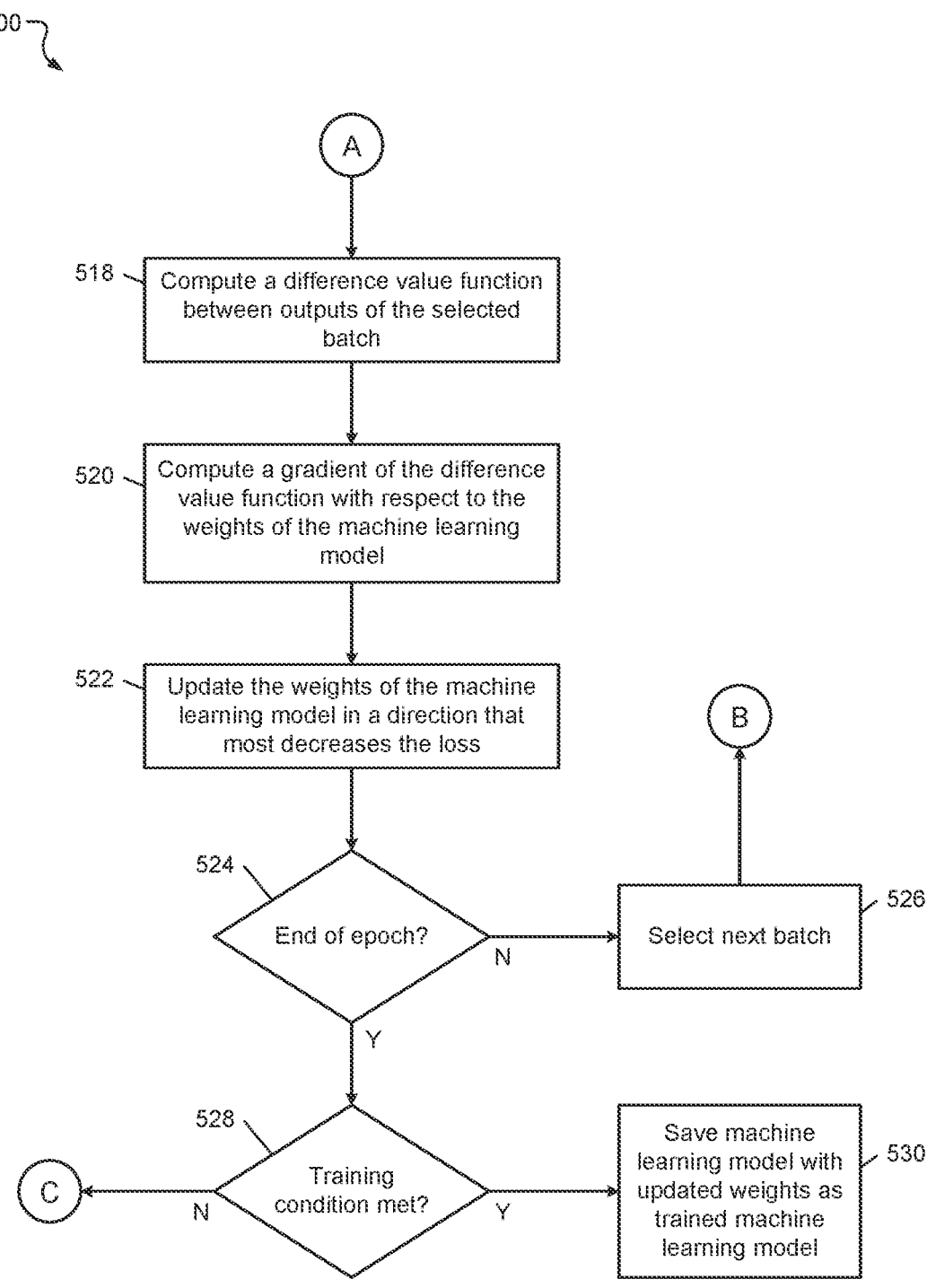

518 — Compute a difference value function between outputs of the selected batch

520 — Compute a gradient of the difference value function with respect to the weights of the machine learning model 522 — Update the weights of the machine learning model in a direction that most decreases the loss 524 — End of epoch?

526 — Select next batch

B

528 — Training condition met?

530 — Save machine learning model with updated weights as trained machine learning model

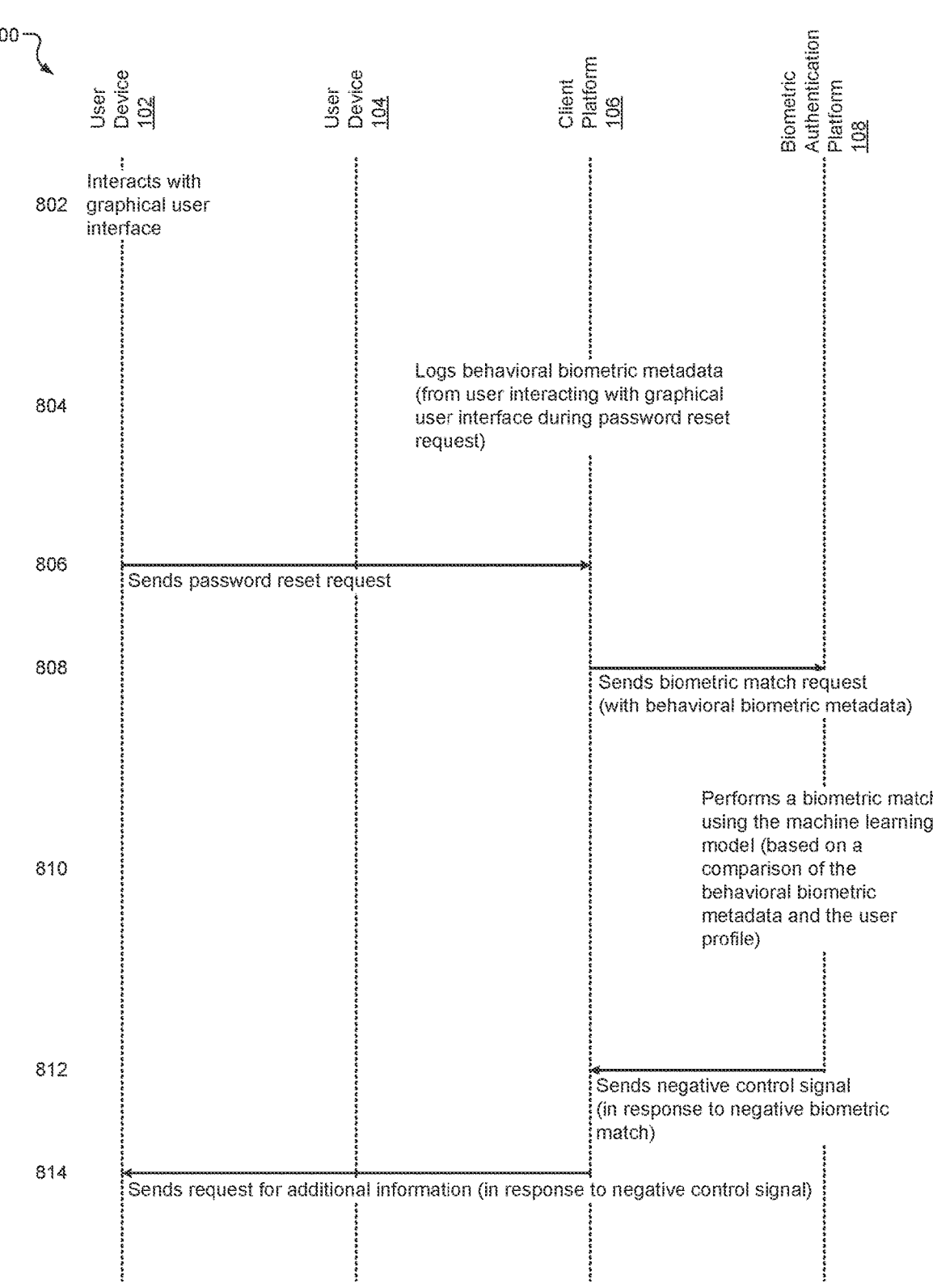

800

User Device 102

User Device 104

Client Platform 106

Biometric Authentication Platform 108

802    Interacts with graphical user interface

804    Logs behavioral biometric metadata (from user interacting with graphical user interface during password reset request)

806    Sends password reset request

808    Sends biometric match request (with behavioral biometric metadata)

810    Performs a biometric match using the machine learning model (based on a comparison of the behavioral biometric metadata and the user profile)

812    Sends negative control signal (in response to negative biometric match)

814    Sends request for additional information (in response to negative control signal)

FIG. 8

900

902 — Load behavioral biometric metadata

904 — Process behavioral biometric metadata to generate input features

906 — Load user profile

908 — Provide input features to trained machine learning model to generate output 910 — Provide user profile to trained machine learning model to generate reference output 912 — Compute a closeness between generated output and generated reference output 914 — Closeness ≥ threshold?

Y → D

N → Generate negative control signal — 916

*FIG. 9A*

1000

1002 — Receive authentication request including password and behavioral biometric metadata 1004 — Password correct?

Y → 1006 Generate positive control signal

N

1008 — Compute closeness between received password and reference password

1010 — Closeness ≥ threshold?

N →

Y

1014 — Perform biometric match between behavioral biometric metadata and user profile 1016 — Biometric match?

N →

Y →

1012 — Generate negative control signal

*FIG. 10*

ARTIFICIAL-INTELLIGENCE-ENABLED AUTHENTICATION BASED ON USER METADATA

FIELD

The present disclosure relates to computer security techniques and, more particularly, to artificial-intelligence-enabled computer and network security techniques based on machine-captured metadata.

SUMMARY

Securely authenticating password reset requests is critical for maintaining the security and integrity of user accounts and computer systems and networks. If password reset requests are not properly authenticated, malicious actors may be able to exploit weaknesses associated with the reset process to attack and/or maliciously access resources of computer systems and networks (e.g, by introducing viruses and/or malware to the systems and networks). For example, user accounts are often part of larger networks. Therefore, even a single compromised account (e.g., exploited via insecure password reset processes) can provide a pathway for attackers to move laterally through the computer system or network and access additional resources. Furthermore, if a malicious actor successfully resets a password and gains access to an account, they may be able to alter account recovery information and other settings, making it easier for them to maintain access to the compromised account or to compromise the account again in the future.

At the same time, users need to be able to regain access to their accounts when they forget their passwords. Often, password reset links are sent to the user's email address. However, if the user's email account is not secure or is itself compromised, malicious actors may be able to intercept the password reset email to gain access to the user's account. Sometimes, systems use security questions as a form of authentication during the password reset process. However, answers to these questions may be guessed or obtained through social engineering. These questions may also be susceptible to brute-force attacks. Additionally, users may not always keep their account recovery information (such as recovery phone number or email addresses) up to date. This can present additional challenges during the password reset process if users no longer have access to those phone numbers or email addresses.

In summary, there are a myriad of technical challenges associated with designing computer systems and networks to have password reset processes that are both secure and easy-to-use for the end user. Generally, the more secure a password reset process is, the more burdensome it is for the end user. Therefore, what is needed are techniques for securely authenticating password reset requests that are relatively transparent to end users and that do not rely on insecure external communications systems (such as external email accounts or cell phones).

In some embodiments, a system includes memory hardware configured to store instructions and one or more electronic processors configured to execute the instructions. The instructions include retrieving historical behavioral biometric metadata from one or more computing platforms, generating a user profile based on the logged historical behavioral biometric metadata, receiving an authentication request from a client computing platform, providing the first behavioral biometric metadata and the user profile to a trained machine learning model to generate a biometric match, generating a positive control signal in response to a positive biometric match, sending the positive control signal to the client computing platform, updating the historical behavioral biometric metadata with the first behavioral biometric metadata, and retraining the trained machine learning model using the updated historical behavioral biometric metadata. The authentication request includes first behavioral biometric metadata.

In other features, providing the first behavioral biometric metadata and the user profile to the trained machine learning model to generate the biometric match includes providing the user profile to the trained machine learning model to generate a reference output, providing the first behavioral biometric metadata to the trained machine learning model to generate a first output, and computing a closeness of the reference output and the first output. In other features, the instructions include generating the positive biometric match in response to the closeness meeting or exceeding a threshold. In other features, the instructions include generating a negative biometric match in response to the closeness not meeting or exceeding the threshold. In other features, the client computing platform is configured to authenticate a password reset request from a user device in response to receiving the positive control signal.

In other features, the client computing platform is configured to authenticate a login request from a user device in response to receiving the positive control signal. In other features, the first behavioral biometric metadata includes keystroke metadata. In other features, the keystroke metadata includes keystroke dynamics metadata. In other features, the keystroke dynamics metadata includes a dwell time. In other features, the keystroke dynamics metadata includes a flight time.

In other examples, a computer-implemented method includes retrieving historical behavioral biometric metadata from one or more computing platforms, generating a user profile based on the logged historical behavioral biometric metadata, receiving an authentication request from a client computing platform, providing the first behavioral biometric metadata and the user profile to a trained machine learning model to generate a biometric match, generating a positive control signal in response to a positive biometric match, sending the positive control signal to the client computing platform, updating the historical behavioral biometric metadata with the first behavioral biometric metadata, and retraining the trained machine learning model using the updated historical behavioral biometric metadata. The authentication request includes first behavioral biometric metadata.

In other features, providing the first behavioral biometric metadata and the user profile to the trained machine learning model to generate the biometric match includes providing the user profile to the trained machine learning model to generate a reference output, providing the first behavioral biometric metadata to the trained machine learning model to generate a first output, and computing a closeness of the reference output and the first output. In other features, the method includes generating the positive biometric match in response to the closeness meeting or exceeding a threshold. In other features, the method includes including generating a negative biometric match in response to the closeness not meeting or exceeding the threshold.

In other features, the client computing platform is configured to authenticate a password reset request from a user device in response to receiving the positive control signal. In other features, the client computing platform is configured to authenticate a login request from a user device in response to receiving the positive control signal. In other features, the first behavioral biometric metadata includes keystroke metadata. In other features, the keystroke metadata includes keystroke dynamics metadata. In other features, the keystroke dynamics metadata includes a dwell time and a flight time.

In various examples, a computer-implemented method includes retrieving historical behavioral biometric metadata from one or more computing platforms, generating a user profile based on the logged historical behavioral biometric metadata, receiving an authentication request from a client computing platform, determining whether the password matches a reference password associated with the user, computing a closeness between the received password and the reference password in response to determining that the password does not match the reference password, providing the first behavioral biometric metadata and the user profile to a trained machine learning model to generate a biometric match in response to the closeness exceeding a threshold, generating a positive control signal in response to a positive biometric match, and sending the positive control signal to the client computing platform. The authentication request includes a password first behavioral biometric metadata.

Other examples, embodiments, features, and aspects will become apparent by consideration of the detailed description and accompanying drawings.

BRIEF DESCRIPTION OF THE DRAWINGS

FIG. 4 is a flowchart of an example process for generating a training dataset from logged behavioral biometric metadata.

FIGS. 5A-5B are flowcharts of an example process for training a machine learning model using a training dataset.

FIG. 8 is a message sequence chart showing example interactions between components of a system as the system rejects a password reset request based on behavioral biometric metadata.

FIGS. 9A-9B are flowcharts of an example process for performing a biometric match using a machine learning model.

FIG. 10 is a flowchart of an example process for authenticating a user login request based on behavioral biometric metadata.

DETAILED DESCRIPTION

Figure 1:
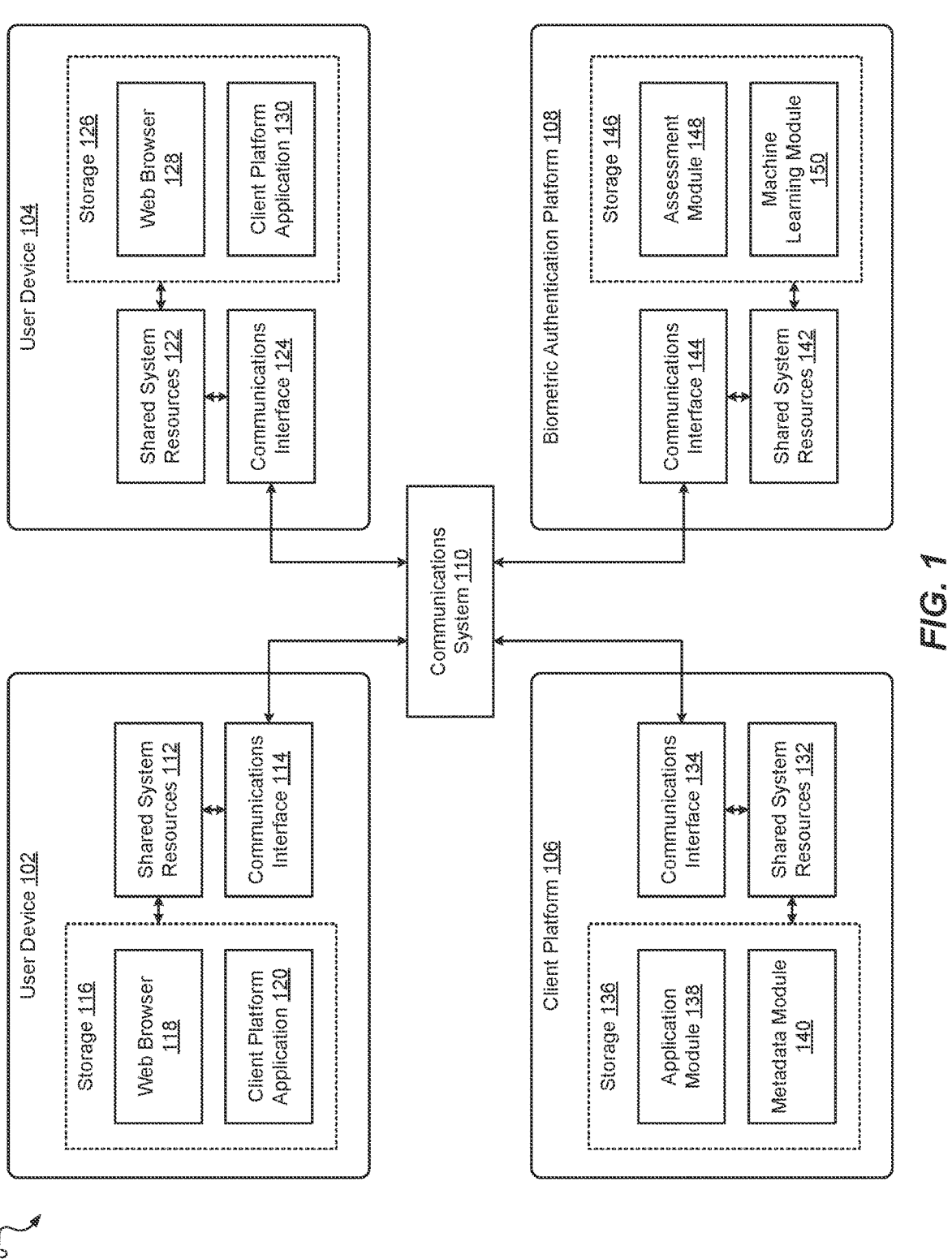
FIG. 1 is a functional block diagram of an example system for authenticating users during password reset requests based on metadata generated during user interactions with graphical user interfaces.

FIG. 1 is a functional block diagram of an example system 100 for authenticating users during password reset requests based on metadata generated during user interactions with graphical user interfaces. As shown in FIG. 1, some examples of the system 100 include user device 102, user device 104, client platform 106, and/or biometric authentication platform 108. User device 102, user device 104, client platform 106, and/or biometric authentication platform 108 may communicate via a communications system 110. Examples of the communications system 110 include one or more networks, such as a General Packet Radio Service (GPRS) network, a Time-Division Multiple Access (TDMA) network, a Code-Division Multiple Access (CDMA) network, a Global System of Mobile Communications (GSM) network, an Enhanced Data Rates for GSM Evolution (EDGE) network, a High-Speed Packet Access (HSPA) network, an Evolved High-Speed Packet Access (HSPA+) network, a Long Term Evolution (LTE) network, a Worldwide Interoperability for Microwave Access (WiMAX) network, a 5th-generation mobile network (5G), an Internet Protocol (IP) network, a Wireless Application Protocol (WAP) network, or an IEEE 802.11 standards network, as well as any suitable combination of the above networks. In various implementations, the communications system 110 include an optical network, a local area network, and/or a global communication network, such as the Internet.

In some examples, the user device 102 may include any device for accessing the Internet, such as a smartphone, tablet, laptop, desktop, or other suitable device. For example, the user device 102 includes shared system resources 112, communications interface 114, and/or one or more data stores that include non-transitory computer-readable storage media, such as storage 116. Shared system resources 112 may include one or more electronic processors, one or more graphics processing units, volatile computer memory, non-volatile computer memory, and/or one or more system buses connecting components of shared system resources 112, communications interface 114, and/or storage 116. In various implementations, storage 116 includes one or more software modules, such as web browser 118 and/or client platform application 120. Additional functionality of web browser 118 and client platform application 120 will be described further on in this specification with reference to the figures.

In some examples, the user device 104 may include any suitable device for accessing the Internet, such as a smartphone, tablet, laptop, or desktop. For example, the user device 104 includes shared system resources 122, communications interface 124, and/or one or more data stores that include non-transitory computer-readable storage media, such as storage 126. Shared system resources 122 may include one or more electronic processors, one or more graphics processing units, volatile computer memory, non-volatile computer memory, and/or one or more system buses connecting components of shared system resources 122, communications interface 124, and/or storage 126. In various implementations, storage 126 includes one or more software modules, such as web browser 128 and/or client platform application 130. Additional functionality of web browser 128 and client platform application 130 will be described further on in this specification with reference to the figures.

In various implementations, client platform 106 includes shared system resources 132, communications interface 134, and/or one or more data stores that include non-transitory computer-readable storage media, such as storage 136. Shared system resources 132 may include one or more electronic processors, one or more graphics processing units, volatile computer memory, non-volatile computer memory, and/or one or more system buses connecting components of shared system resources 132, communications interface 134, and/or storage 136. In some examples, storage 136 includes one or more software modules, such as application module 138 and/or metadata module 140. Additional functionality of application module 138 and metadata module 140 will be described further on in this specification with reference to the figures.

In some embodiments, biometric authentication platform 108 includes shared system resources 142, communications interface 144, and/or one or more data stores that include non-transitory computer-readable storage media, such as storage 146. Shared system resources 142 may include one or more electronic processors, one or more graphics processing units, volatile computer memory, non-volatile computer memory, and/or one or more system buses connecting components of shared system resources 142, communications interface 144, and/or storage 146. In various implementations, storage 146 includes one or more software modules, such as assessment module 148 and/or machine learning module 150. Additional functionality of assessment module 148 and machine learning module 150 will be described further on in this specification with reference to the figures.

Components of user device 102, user device 104, client platform 106, and/or biometric authentication platform 108 may communicate with each other via communications system 110. For example, components of user device 102 may communicate with communications system 110 via communications interface 114, components of user device 104 may communicate with communications system 110 via communications interface 124, components of client platform 106 may communicate with communications system 110 via communications interface 134, and/or components of biometric authentication platform 108 may communicate with communications system 110 via communications interface 144.

Figure 2A:
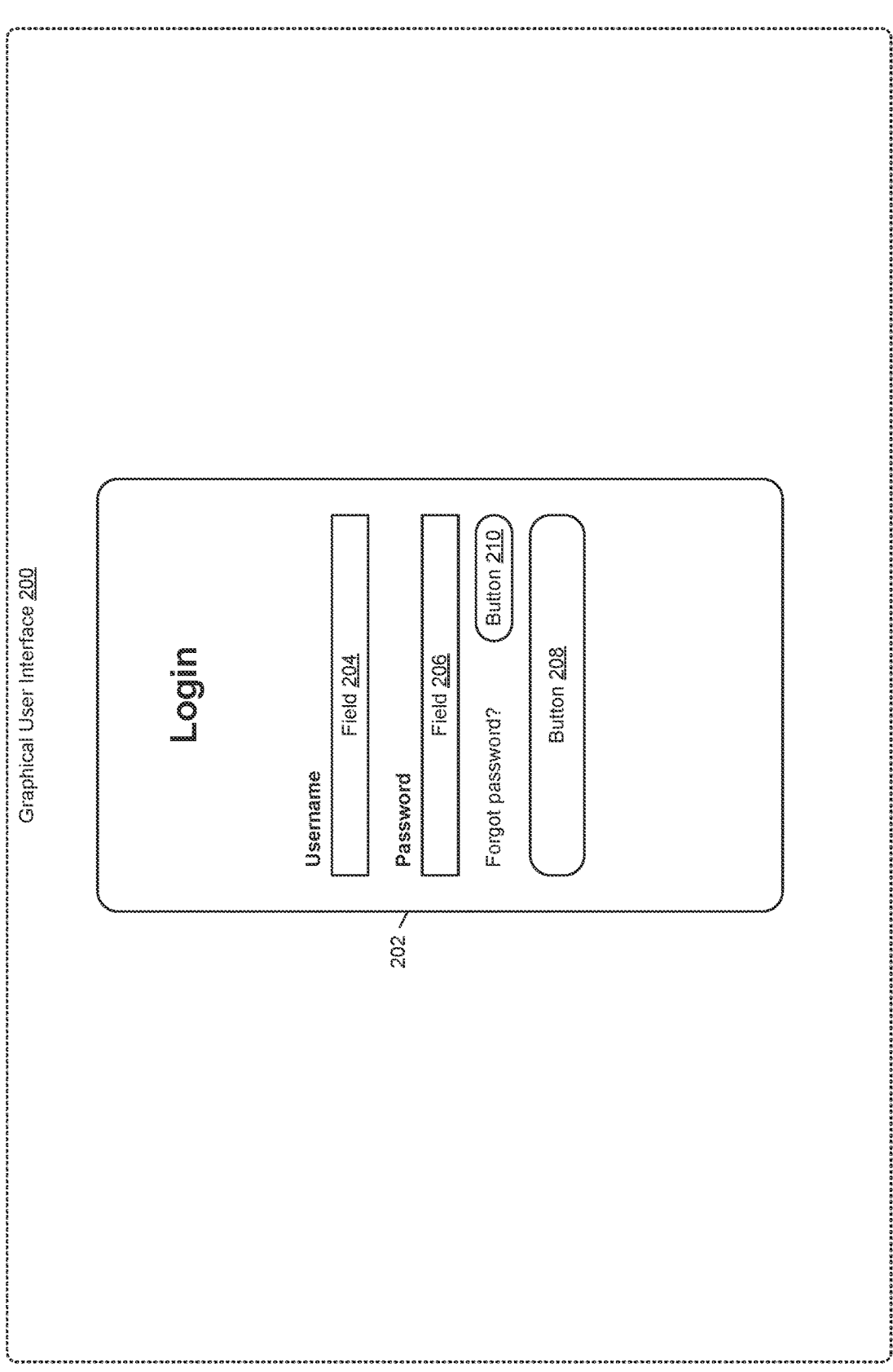
FIG. 2A is an example graphical user interface generated by a client platform that shows a login screen.

FIG. 2A is an example graphical user interface 200 generated by client platform 106. As shown in FIG. 2A, application module 138 may generate a login screen 202 at graphical user interface 200. In various implementations, users may access graphical user interface 200 via user device 102 and/or user device 104. For example, users may access graphical user interface 200 via web browser 118, client platform application 120, web browser 128, and/or client application platform 130. The screens of graphical user interface 200 may include one or more interactive user interface elements, such as fillable fields, drop-down menus, and/or buttons. In some examples, users may select any of the interactive user interface elements with a keyboard, mouse, trackpad, and/or by interacting with a touchscreen, depending on the nature of user devices 102 or 104. In various implementations, login screen 202 includes a username field, such as field 204, and a password field, such as field 206. Fields 204 and 206 may be fillable text fields. For example, the user may select one of fields 204 and 206 and input a text string into the field. After the user populates fields 204 and 206, the user may select button 208 to log in to the client platform 106. In response to the user forgetting their login credentials (such as their username and/or password), the user may select button 210 to initiate a password reset request.

Figure 2B:
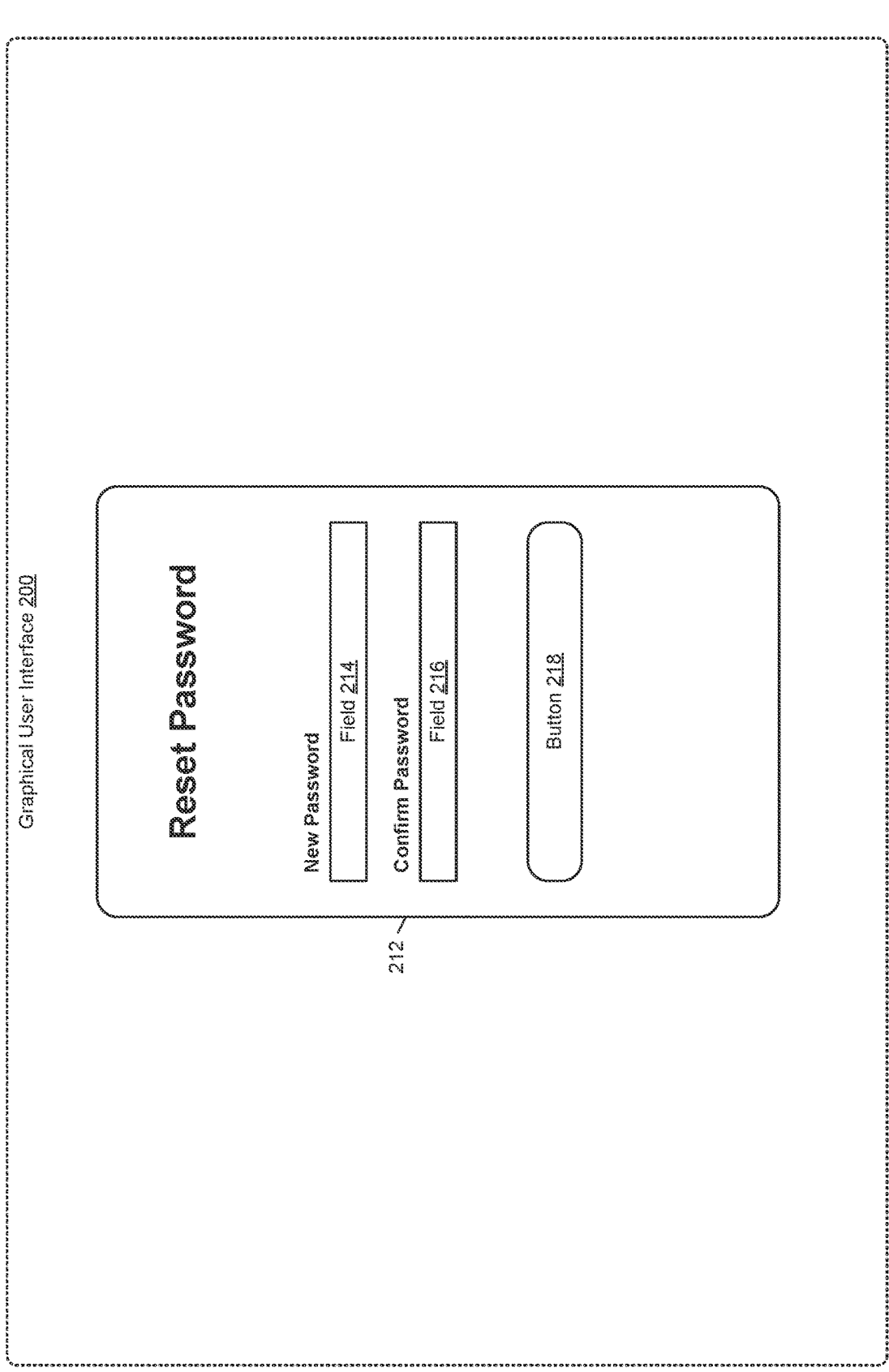
FIG. 2B is an example graphical user interface generated by a client platform that shows a password reset screen.

FIG. 2B is an example graphical user interface 200 generated by client platform 106. In response to the user selecting button 210, application module 138 generates password reset screen 212 at graphical user interface 200. In some embodiments, password reset screen 212 includes fillable text fields, such as field 214 and field 216. The user may enter a new password into field 214 and re-enter the new password into field 216 to confirm the new password. After entering the new password into fields 214 and 216, the user may select button 218 to reset their password on client platform 106 to the new password entered into fields 214 and 216.

Figure 2C:
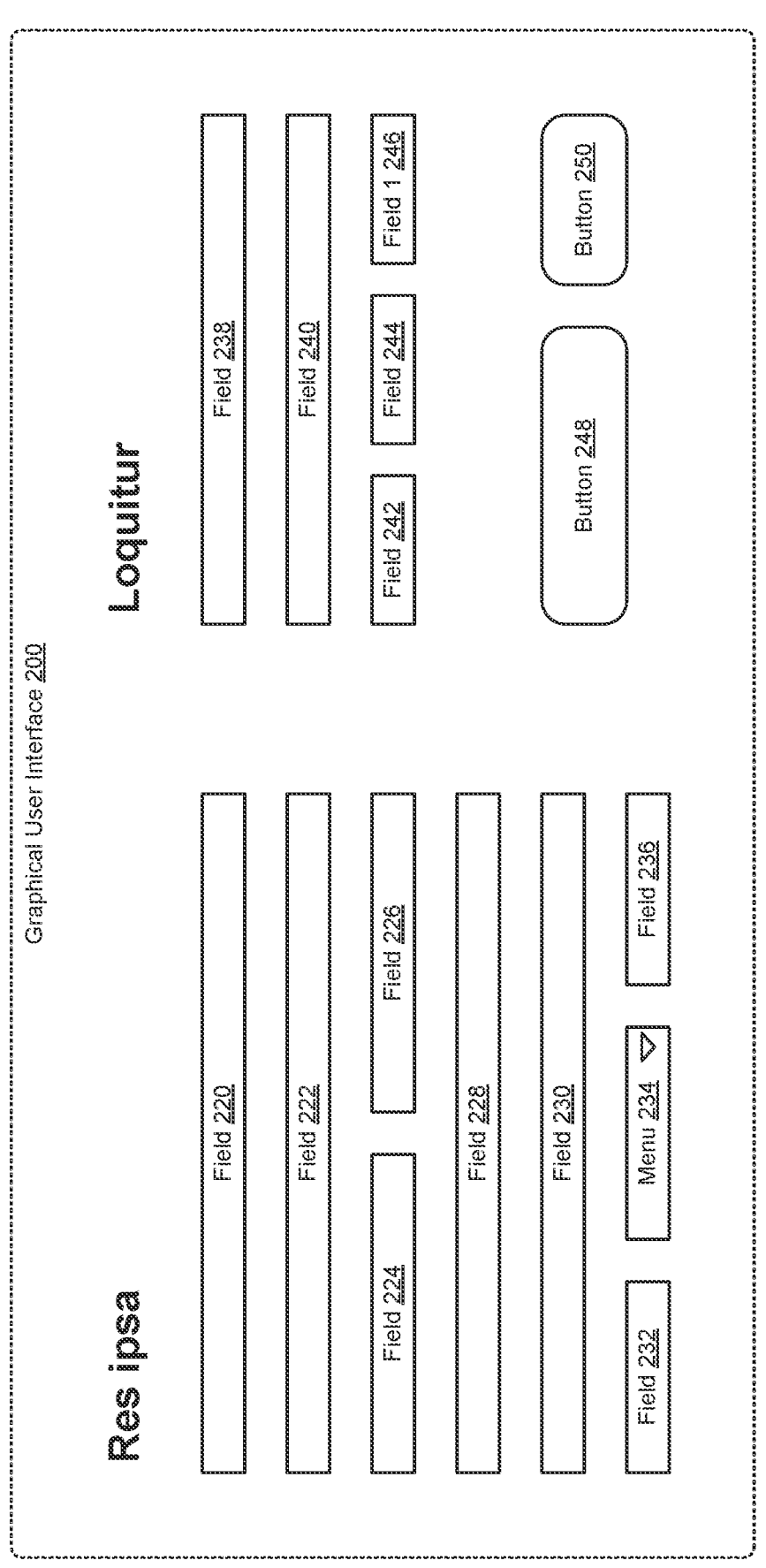
FIG. 2C is an example graphical user interface generated by a client platform that shows a check-out screen.

FIG. 2C is an example graphical user interface 200 generated by client platform 106. In various implementations, client platform 106 may be any type of platform, such as a social media platform, an e-commerce platform, a content creation and sharing platform, a collaboration and productivity platform, an online learning platform, a streaming services platform, a financial services platform, a travel and accommodation platform, or a gaming platform. In examples where client platform 106 is an e-commerce platform, application module 138 may generate a check-out screen at graphical user interface 200, such as shown in FIG. 2C. After selecting one of the fillable fields (such as fields 220-246), users may enter a text string into the selected fillable field. After selecting one of the drop-down menus (such as menu 234), users may select one or more of the options of the selected drop-down menu. After populating fillable fields and/or drop-down menus, users may select button 248 to submit the transaction request or button 250 to exit from the check-out screen.

In various implementations, metadata module 140 tracks user interactions with graphical user interface 200 (for example, at any of the screens shown in FIGS. 2A-2C) and saves information related to the user interactions as behavioral biometric metadata. For example, the behavioral biometric metadata may include keystroke metadata. Keystroke metadata may be captured based on typing patterns as the user inputs text into the fillable fields. Keystroke metadata may include keystroke dynamics metadata, typing speed metadata, error rates and corrections metadata, key combinations metadata, special keys usage metadata, and/or sequence of keystrokes metadata. Examples of keystroke dynamics metadata include the time between pressing and releasing a key (dwell time) and/or the time between pressing one key and pressing the next key (flight time). Examples of typing speed metadata include the average speed at which a user types. Examples of error rates and corrections metadata include the frequency with which the user makes typing errors, as well as the ways in which they correct those errors (for example, whether they use the Backspace or Delete keys, or whether they highlight incorrect text and type over the text). Examples of key combinations metadata include whether the user uses certain key combinations to interact with graphical user interface 200, such as Ctrl+C for copy and Ctrl+V for past and/or using the tab key to switch between fields. Examples of special keys usage metadata include whether the user uses special keys like Shift, Control, Alt, and/or the function keys. Examples of sequence of keystrokes metadata includes the specific sequence of keys the user presses as they interact with graphical user interface 200.

Behavioral biometric metadata may also include touchscreen, mouse, and/or trackpad metadata. For example, touchscreen metadata include tap metadata, long press metadata, swipe metadata, pinch and spread metadata, rotation metadata, scroll metadata, flick metadata, touch force metadata, touch side metadata, and/or sequences of interactions metadata. Examples of tap metadata include the location, timing, and/or frequency of taps on the touchscreen of user device 102. Examples of long press metadata include the location and/or duration of long presses on the touchscreen of user devices 102 and/or 104. Examples of swipe metadata include the direction, speed, distance, and/or path of swipes across the touchscreen of user devices 102 and/or 104. Examples of pinch and spread metadata include the scale, speed, and location of multi-touch gestures used to zoom in (spread) or out (pinch) on the touchscreen of user devices 102 and/or 104. Examples of rotation metadata include the angle, speed, and/or location of using multiple fingers on the touchscreen of user device 102 and/or 104 to rotate graphical user interface 200. Examples of scroll metadata include the direction, speed, and/or distance of scrolls on the touchscreen of user device 102 and/or 104. Examples of flick metadata include the direction, speed, and/or distance of flicks on the touchscreen of user device 102 and/or 104. Examples of touch force metadata include the amount of force applied during a touch interaction on the touchscreen of user device 102 and/or 104. Examples of touch size metadata include the size of the contact area on the touchscreen of user device 102 and/or 104 (for example, touching the touchscreen with the tip of a finger can result in a smaller contact area than touching the touchscreen with the pad of a thumb). Sequences of interactions metadata include the combinations of interactions used to interact with graphical user interface 200.

In various implementations, mouse and/or trackpad metadata include movement patterns metadata, clicks metadata, scrolling metadata, hover time metadata, distance traveled metadata, dwell time metadata, exit movements metadata, and/or start and end points metadata. Examples of movement patterns metadata include the paths that a mouse takes across graphical user interface 200, the speed and acceleration of the mouse, and/or any patterns of movement (such as circling or zig-zagging). Examples of clicks metadata include the number, location, and/or timing of mouse clicks on graphical user interface 200. Left clicks, right clicks, double clicks, and/or clicks-and-drags may also be included in clicks metadata. Examples of scrolling metadata include whether the user scrolls with the mouse wheel or by clicking and dragging a scrollbar. The speed and direction of scrolling as well as the timing and frequency of scrolling may also be included in scrolling metadata. Examples of hover time metadata include the amount of time the mouse pointer stays in one play and/or where the user hovers their mouse pointer (for example, over an area of interest or text as they are reading the text). Examples of distance traveled metadata include the total length of the path a mouse cursor travels over a session. Examples of dwell time metadata includes the amount of time the mouse cursor stays within a specific area or element of graphical user interface 200, such as over a particular field, drop-down menu, and/or button. Examples of exit movements metadata include the movements a mouse cursor makes just before the user leaves a page. For example, the mouse cursor may move towards the top right corner of the screen if the user is about to close a window. Examples of start and end points metadata include the starting point and end point of the mouse cursor.

In some embodiments, behavioral biometric metadata may also include accelerometer and/or gyroscope metadata. Examples of accelerometer and/or gyroscope metadata include an orientation of the user device 102 and/or 104, linear movements of the user device 102 and/or 104 (such as whether it's moving up, down, left, right, forwards, and/or backwards), and/or rotation of the user device 102 and/or 104. In various implementations, behavioral biometric metadata may also include form navigation patterns metadata. Examples of form navigation patterns metadata include when the user clicks into a particular field, when the user exits the field, and/or how long the user spends in the field. In some implementations, the behavioral biometric metadata may be tracked and/or logged at the user device 102 and/or 104. In other implementations, the behavioral biometric metadata may be tracked and/or logged at client platform 106. In some examples, the behavioral biometric metadata may be tracked and/or logged at any combination of user devices 102-104 and client platform 106.

In various implementations, behavioral biometric metadata may be logged from the beginning of a user's session until the end. In some examples, the session begins when the user starts interacting with the graphical user interface and ends when the intended actions are completed (for example, upon the user clicking a submission button on the graphical user interface). In various implementations, the session may also end after a period of time passes during which there are no interactions.

In some embodiments, the behavioral biometric metadata may be represented as a compact signature. For example, the user's interactions with the graphical user interfaces (e.g., mouse movements, clicks, keystrokes, scrolling data, and/or any of the previously described interactions) are initially logged as raw user interaction data. The raw user interaction data may be preprocessed to prepare the raw user interaction data for feature extraction. For example, preprocessing steps may include data cleaning (to remove any corrupted or incomplete records) and/or noise reduction (to remove outliers). Features may then be extracted from the preprocessed user interaction data. In various implementations, simple features such as a number of clicks, average typing speed, and/or time spent on different parts on the graphical user interface. In some examples, complex features such as patterns of mouse movement, click paths, and/or typing patterns could be extracted. In some embodiments, temporal features such as time of day, duration of a session, and/or the interval between specific actions could be extracted. In various implementations, spatial features such as favored positions for mouse clicks and/or areas of the graphical user interface that the user interacts with most often may be extracted.

After features are extracted from the preprocessed user interaction data, a signature may be generated from the extracted features. In various implementations, a data reduction process is used to transform the extracted features into a more compact form that captures key aspects of the user's behavior. For example, extracted features may be transformed into a signature using dimensionality reduction techniques such as principal component analysis or t-distributed stochastic neighbor embedding. In other examples, extracted features may be transformed into the signature using clustering techniques such as k-means clustering algorithms or density-based clustering algorithms. In various implementations, extracted features may be transformed into the signature using deep learning techniques. For example, autoencoders can be used to generate a lower-dimensional representation of the extracted features. In various implementations, the generated signatures may be normalized. For example, the signatures may be scaled so that the signatures may have the same, similar, or comparable magnitudes across all users of the system 100.

Representing behavioral biometric metadata as compact signatures offers a variety of technical benefits. For example, logged raw user interactions may have very large file sizes. Thus, transmitting logged raw user interactions as the behavioral biometric metadata may require large data payloads to be constantly transmitted across components of the system 100, which introduces latency into the data transmission process and may be computationally intensive. Furthermore, logged raw user interactions could potentially include sensitive data (for example, data that could potentially be reconstructed to generate user login credentials and/or personal user information). Representing logged raw user interactions as compact signatures reduces data transmission and computational requirements of the system 100 and increases the security of the system 100 by protecting sensitive user data from being compromised.

Figure 3:
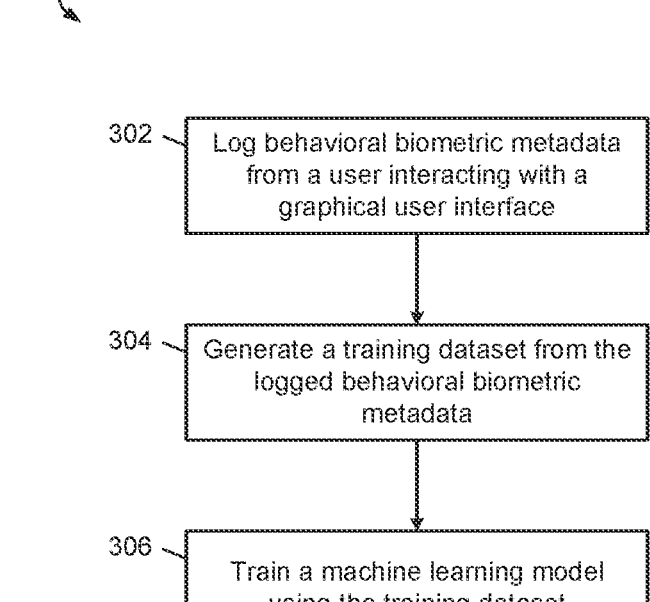
FIG. 3 is a flowchart of an example process for training a machine learning model using behavioral biometric metadata.

FIG. 3 is a flowchart of an example process 300 for training a machine learning model using behavioral biometric metadata. At 302, client platform 106 logs behavioral biometric metadata from a user interacting with a graphical user interface-such as graphical user interface 200 previously described with reference to FIGS. 2A-2C. Client platform 106 sends the logged behavioral biometric metadata to biometric authentication platform 108.

At 304, biometric authentication platform 108 generates a training dataset from the logged behavioral biometric metadata. Additional details associated with generating the training dataset will be described further on in this specification with reference to FIG. 4.

At 306, biometric authentication platform 108 trains a machine learning model using the training dataset. Additional details associated with training the machine learning model will be described further on in this specification with reference to FIGS. 5A-5B.

FIG. 4 is a flowchart of an example process 400 for generating a training dataset from logged behavioral biometric metadata. At 402, machine learning module 150 preprocesses the logged behavioral biometric metadata. In various implementations, the logged behavioral biometric metadata is transformed into scalars, vectors, arrays, and/or tensors suitable for input to the machine learning model. The logged biometric metadata is then normalized and/or standardized.

At 404, machine learning module 150 computes a covariance matrix of the preprocessed metadata. In some embodiments, the covariance matrix is a square matrix that captures the variance of each feature in the preprocessed metadata as well as the covariance (such as how much they vary together) between each pair of features.

At 406, machine learning module 150 computes eigenvectors and eigenvalues of the covariance matrix. In some examples, the eigenvectors represent directions or components in the feature space, and the eigenvalues represent the magnitude or amount of variance of each component.

At 408, machine learning module 150 sorts the eigenvectors in descending order (based on the magnitude of their corresponding eigenvalues). This ranks the components in order of importance.

At 410, machine learning module 150 selects the top n eigenvectors as principal components. At 412, machine learning module 150 transforms the preprocessed metadata by projecting it onto the principal components. This transforms the preprocessed metadata into a new dataset having n features (instead of the original number of features). The new dataset is saved as the training dataset.

Figure 5A:
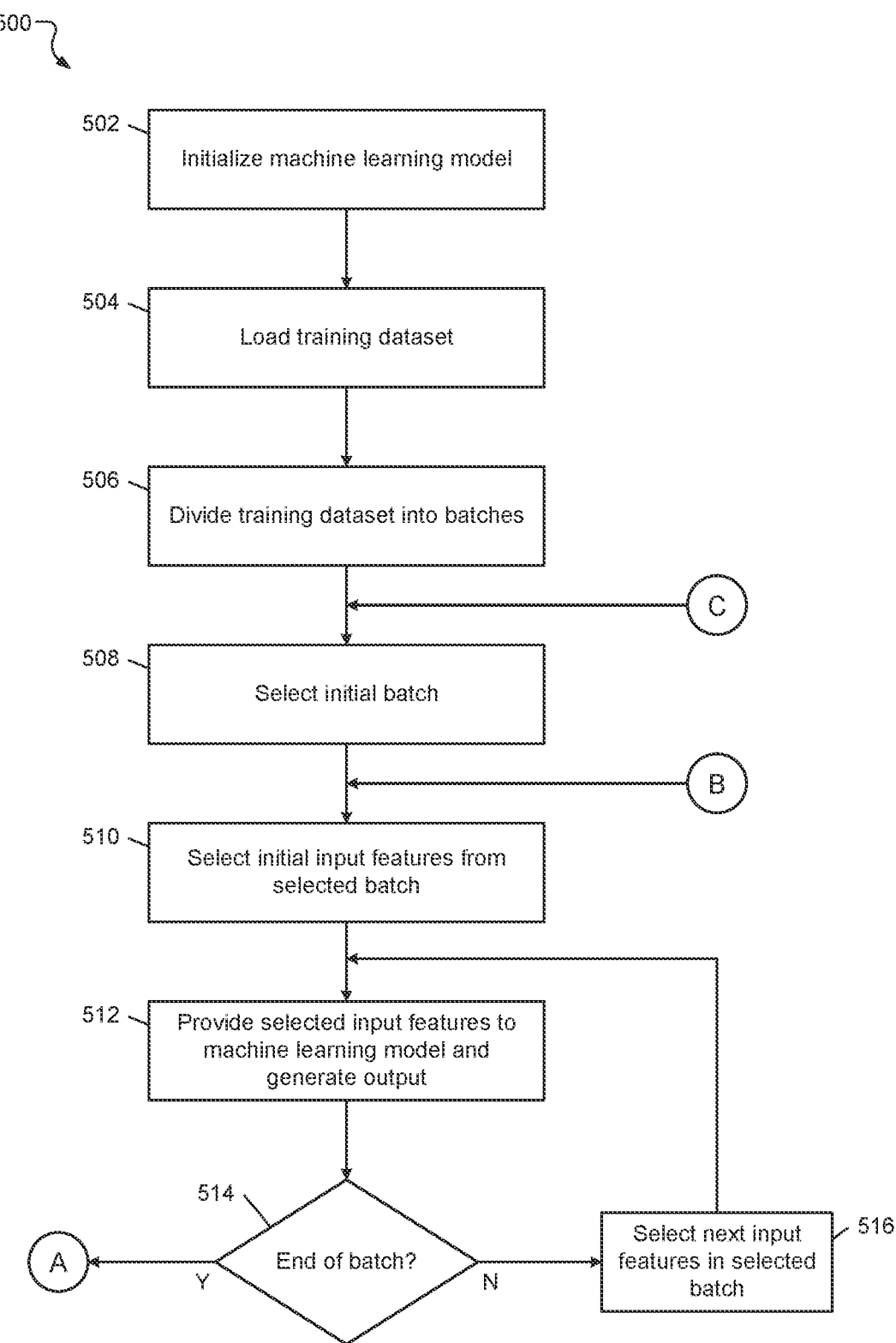

FIGS. 5A-5B are flowcharts of an example process 500 for training a machine learning model using the training dataset. At 502, machine learning module 150 initializes the machine learning model. In examples where the machine learning model includes a neural network machine, machine learning module 150 initializes the weights for the connections between nodes of the neural network with small random values.

At 504, machine learning module 150 loads the training dataset. In various implementations, the training dataset may include behavioral biometric metadata associated with a single user. At 506, machine learning module 150 divides the training dataset into one or more batches.

At 508, machine learning module 150 selects the initial batch. At 510, machine learning module 150 selects initial input features from the selected batch. At 512, machine learning module 150 provides the selected input features to the machine learning model and generates an output.

At 514, machine learning module 150 determines whether the end of the batch has been reached. In response to determining that the end of the batch has not been reached ("NO" at decision block 514), machine learning module 150 selects the next input features in the selected batch at block 516 and proceeds back to block 512. In response to determining that the end of the batch has been reached ("YES" at decision block 514), machine learning module 150 computes a difference value function between outputs of the selected batch (at block 518). In various implementations, the difference value function calculates a difference (or closeness) between each of the output values in the batch. For example, if the output values are very different, the difference value function could converge on a first value. If the output values are very similar, the difference value function could converge on a second value. In various implementations, the first value could be 0 and the second value could be 1. In some embodiments, the first value could be 1 and the second value could be 0.

At 520, machine learning module 150 computes a gradient of the average loss function with respect to the weights. At 522, machine learning module 150 updates the weights of the machine learning model in a direction so that the difference value function converges on the second value. For example, machine learning module 150 uses an optimization algorithm such as gradient descent. If the learning rate is represented by η, then an example weight update rule may be represented by equation (1) below:

$$\text{weight} = \text{weight} - \eta \cdot \text{gradient} \tag{1}$$

At 524, machine learning module 150 determines whether the end of the epoch has been reached. In various implementation, the epoch is represented by the entirety of the training dataset, and so the end of the epoch is reached after each set of input features has been processed. In response to determining that the end of the epoch has not been reached ("NO" at decision block 524), machine learning module 150 selects the next batch at 526 and proceeds again to block 510. In response to determining that the end of the epoch has been reached ("YES" at decision block 524), machine learning module 150 determines whether a training condition has been met. In various implementations, the training condition may be met when the closeness between output values for a given batch or the entire epoch exceeds a threshold. In various implementations, the training condition may be met when machine learning module 150 has processed a predefined number of epochs. In response to determining that the training condition has been met ("YES" at decision block 528), machine learning module 150 saves the machine learning model with the updated weights as the trained machine learning model at 530. In response to determining that the training condition has not been met ("NO" at decision block 528), machine learning module 150 again selects the initial batch of the training dataset at block 510.

Figure 6:
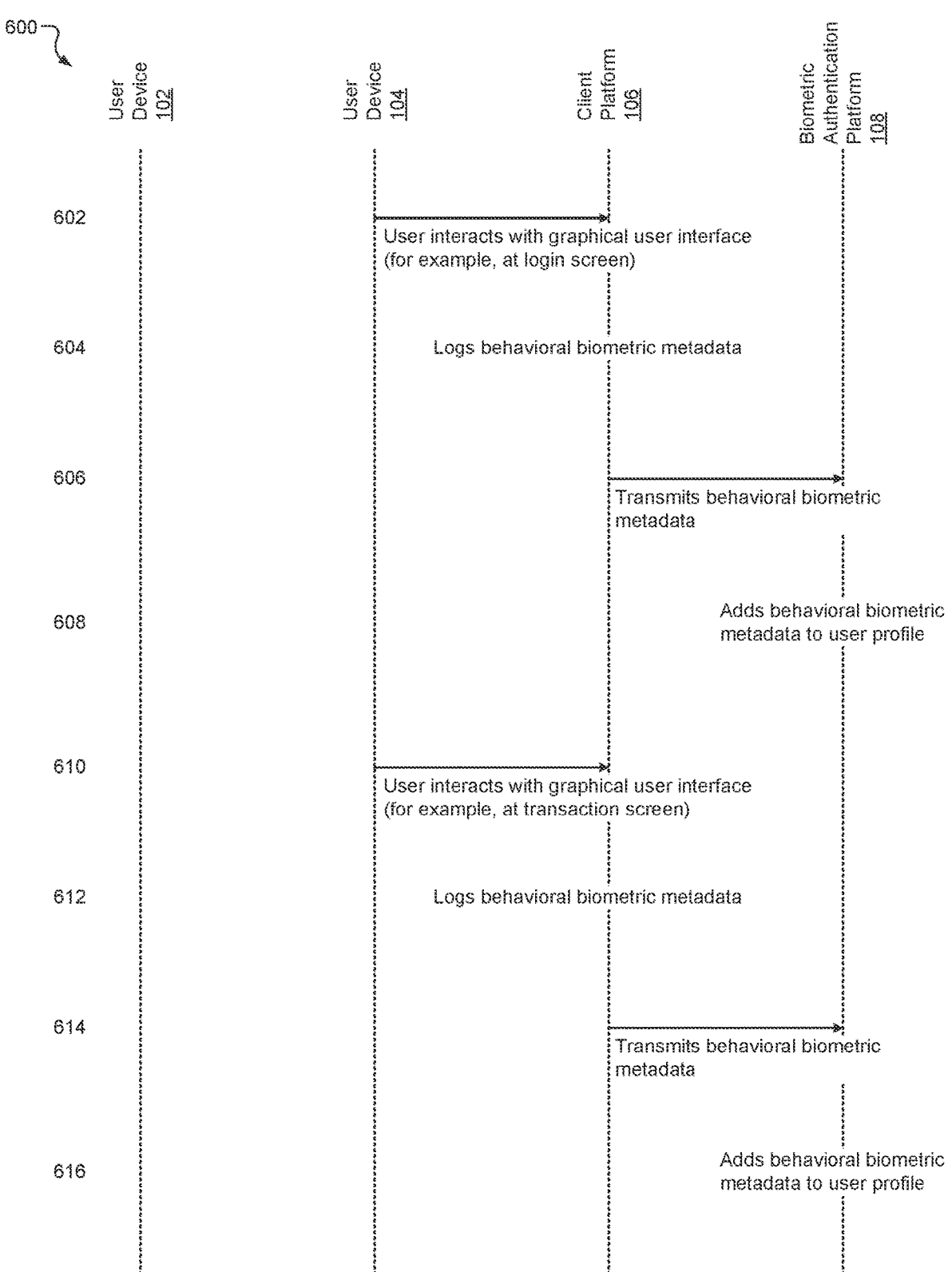
FIG. 6 is a message sequence chart showing example interactions between components of a system as the system builds a user profile based on behavioral biometric metadata.

FIG. 6 is a message sequence chart 600 showing example interactions between components of the system 100 as the system 100 builds a user profile based on behavioral biometric metadata. At 602, user device 104 interacts with graphical user interface 200 generated by client platform 106. For example, graphical user interface 200 may include a login screen (such as that shown in FIG. 2A) or a check-out screen (such as that shown in FIG. 2C). The user may access graphical user interface 200 via web browser 128 and/or client platform application 130 and interact with elements of graphical user interface 200 using one or more of a touch-screen, keyboard, mouse, and trackpad. For example, the user may select field 204 and type in their username, select field 206 and type in their password, and click button 208 to submit their login credentials to client platform 106.

At 604, client platform 106 logs the user interactions as behavioral biometric metadata. For example, metadata module 140 logs keystroke metadata associated with how the user enters their username into field 204 and/or how the user enters their password into field 206.

At 606, client platform 106 transmits the logged behavioral biometric metadata to biometric authentication platform 108. At 608, biometric authentication platform 108 adds the logged behavioral biometric metadata to a user profile.

At 610, the user device 104 interacts with graphical user interface 200 generated by client platform 106. In various implementations, the graphical user interface 200 may be a transactional screen, such as check-out screen shown in FIG. 2C. The user may interact elements of graphical user interface 200 using one or more of a touchscreen, keyboard, mouse, and trackpad.

At 612, client platform 106 logs the user interactions as behavioral biometric metadata. For example, metadata module 140 logs the user interactions as behavioral biometric metadata.

At 614, client platform 106 transmits the logged behavioral biometric metadata to biometric authentication platform 108. At 616, biometric authentication platform 108 adds the logged behavioral biometric metadata to the user profile.

Figure 7:
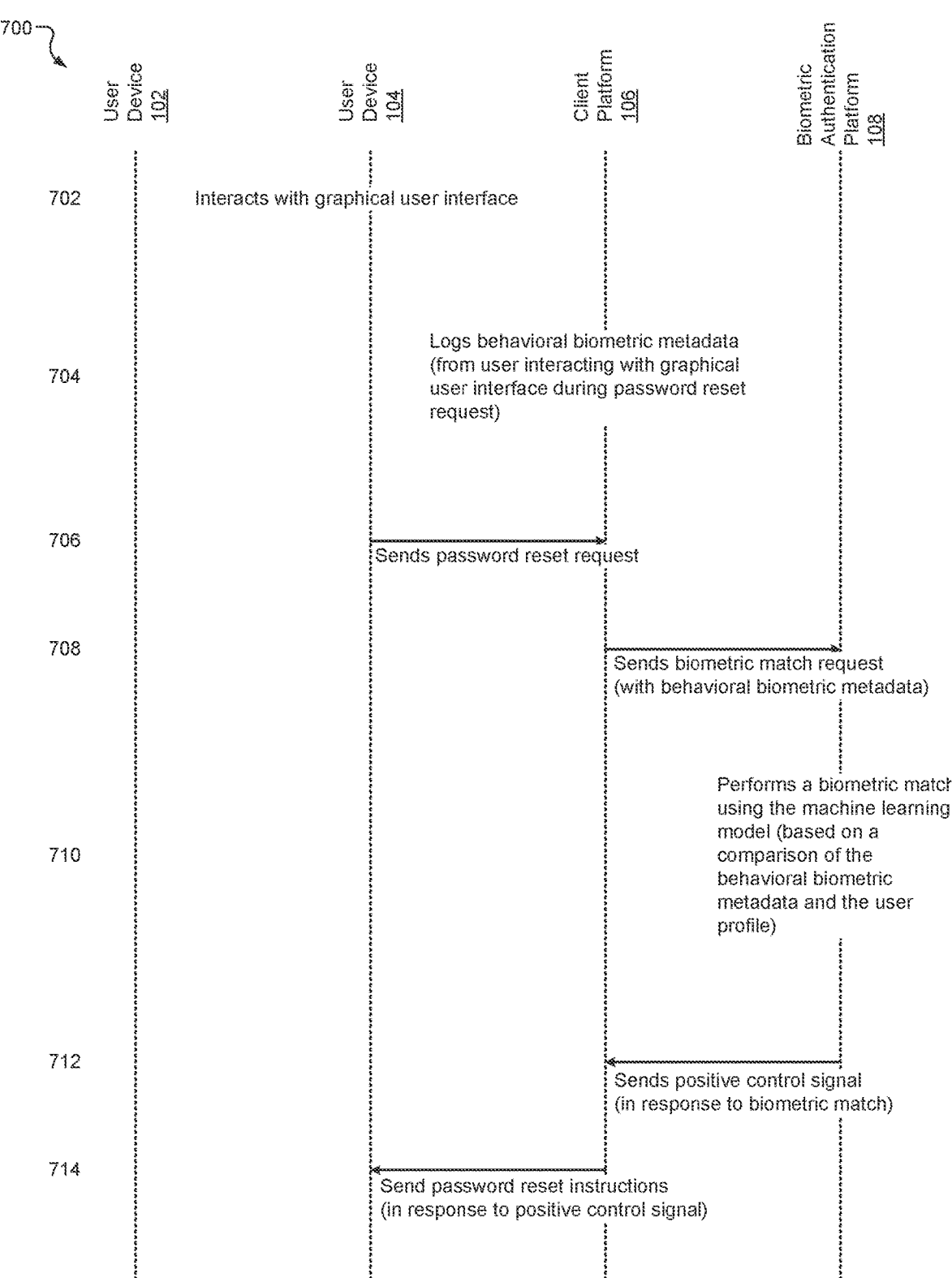
FIG. 7 is a message sequence chart showing example interactions between components of a system as the system successfully authenticates a password reset request based on behavioral biometric metadata.

FIG. 7 is a message sequence chart 700 showing example interactions between components of the system 100 as the system 100 successfully authenticates a password reset request based on behavioral biometric metadata. At 702, user device 104 interacts with interacting with graphical user interface 200 during a password reset request. For example, application module 138 generates a login screen at graphical user interface 200, and the user interacts with elements of graphical user interface 200 at web browser 128 and/or client platform application 130. For example, the user may interact elements of graphical user interface 200 using one or more of a touchscreen, keyboard, mouse, and trackpad. In various implementations, the user types their username into field 204 and selects button 210 at the login screen shown in FIG. 2A.

At 704, client platform 106 logs the behavioral biometric metadata generated by the user's interactions with graphical user interface 200. For example, behavioral biometric metadata—such as keystroke metadata—from the user's interactions are captured is logged by metadata module 140.

At 706, user device 104 sends the password reset request to client platform 106. At 708, client platform 106 sends a biometric match request and the behavioral biometric metadata to biometric authentication platform 108.

At 710, biometric authentication platform 108 performs a biometric match using a trained machine learning model. In various implementations, machine learning module 150 performs a biometric match using the trained machine learning model based on a comparison of the behavioral biometric metadata and the user profile. Additional details associated with performing the biometric match are described further on in this specification with reference to FIGS. 9A-9B.

At 712, biometric authentication platform 108 generates and sends a positive control signal to client platform 106 in response to a positive biometric match. At 714, client platform 106 sends password reset instructions to user device 104 in response to the positive control signal. For example, application module 138 generates the reset password screen of FIG. 2B. The user enters their new password in fields 214 and 216 and then selects button 218 to submit the reset password request.

FIG. 8 is a message sequence chart 800 showing example interactions between components of the system 100 as the system 100 rejects a password reset request based on behavioral biometric metadata. At 802, user device 102 interacts with interacting with graphical user interface 200 during a password reset request. For example, application module 138 generates a login screen at graphical user interface 200, and the user interacts with elements of graphical user interface 200 at web browser 118 and/or client platform application 120. For example, the user may interact with elements of graphical user interface 200 using one or more of a touchscreen, keyboard, mouse, and trackpad. In various implementations, the user types their username into field 204 and selects button 210 at the login screen shown in FIG. 2A.

At 804, client platform 106 logs the behavioral biometric metadata generated by the user's interactions with graphical user interface 200. For example, behavioral biometric metadata—such as keystroke metadata—from the user's interactions is captured and logged by metadata module 140.

At 806, user device 102 sends the password reset request to client platform 106. At 808, client platform 106 sends a biometric match request and the behavioral biometric metadata to biometric authentication platform 108.

At 810, biometric authentication platform 108 performs a biometric match using a trained machine learning model. In various implementations, machine learning module 150 performs a biometric match using the trained machine learning model based on a comparison of the behavioral biometric metadata and the user profile. Additional details associated with performing the biometric match are described further on in this specification with reference to FIGS. 9A-9B.

At 812, biometric authentication platform 108 generates and sends a negative control signal to client platform 106 in response to a negative biometric match. At 814, client platform 106 sends a request for additional information to user device 102 in response to the negative control signal.

Figure 9B:
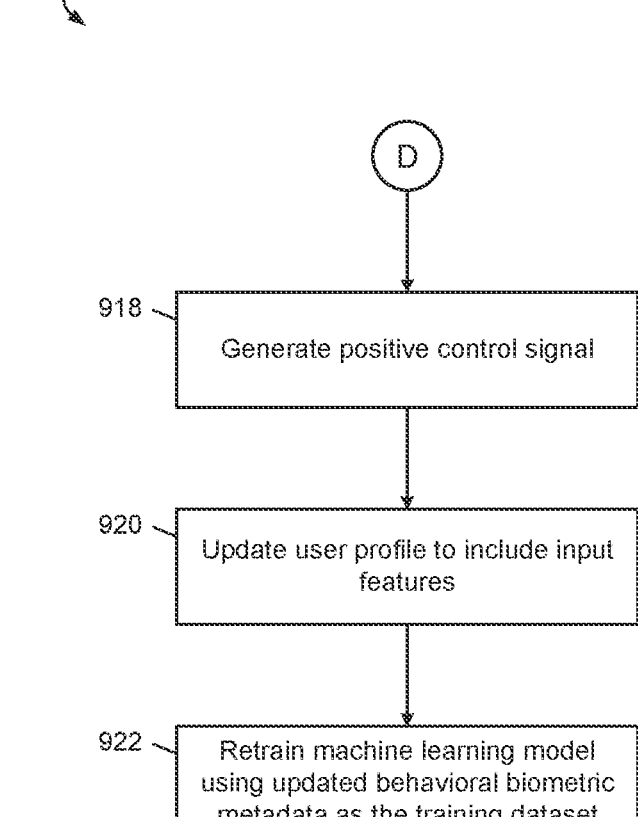

FIGS. 9A-9B are flowcharts of an example process 900 for performing a biometric match using a machine learning model. At 902, machine learning module 150 loads behavioral biometric metadata. In various implementations, the behavioral biometric metadata may be related to password reset request.

At 904, machine learning module 150 processes the behavioral biometric metadata to generate input features for a trained machine learning model. At 906, machine learning module 150 loads a user profile.

At 908, machine learning module 150 provides the input features to the trained machine learning model to generate an output. At 910, machine learning module 150 provides the loaded user profile to the trained machine learning model to generate a reference output. At 912, machine learning module 150 calculates a closeness between the generated output and the generated reference output.

In response to the closeness being below a threshold ("NO" at decision block 914), assessment module 148 generates a negative control signal at 916. In response to the closeness being at or above the threshold ("YES" at decision block 914), assessment module 148 generates a positive control signal at 918.

At 920, machine learning module 150 updates the user profile to include the input features (e.g., representing behavioral biometric metadata generated from the users interacting with graphical user interface 200 during the current password reset request).

At 922, machine learning module retrains the machine learning model using the updated behavioral biometric metadata as the training dataset (for example, according to principles previously described with reference to FIGS. 5A-5B).

FIG. 10 is a flowchart of an example process 1000 for authenticating a user login request based on behavioral biometric metadata. At 1002, biometric authentication platform 108 receives an authenticating request including a password input by a user and behavioral biometric metadata related to the login attempt. For example, the user may input their username into field 204 of login screen 202 at graphical user interface 200, input their password into field 206, and select button 208. In various implementations, the behavioral biometric metadata may be related to the user's interactions with login screen 202.

At 1004, assessment module 148 determines whether the received password is correct. For example, assessment module 148 compares the received password with a reference password associated with the user. In various implementations, assessment module 148 compares a hashed version of the received password with a hashed version (using the same hashing technique) of the reference password associated with the user. In response to determining that the password is correct ("YES" at decision block 1004), assessment module 148 generates a positive control signal at 1006. In response to determining that the password is not correct ("NO" at decision block 1004), assessment module 148 computes a closeness between the received password and the corresponding reference password (e.g., the correct password) at 1008. In various implementations, assessment module 148 computes the closeness between a hashed version of the received password and a hashed version of the corresponding reference password (using the same hashing technique).

At 1010, assessment module 148 determines whether the closeness meets or exceeds a threshold. In response to determining that the closeness does not meet or exceed the threshold ("NO" at decision block 1010), assessment module 148 generates a negative control signal at 1012. In response to determining that the closeness meets or exceeds the threshold ("YES" at decision block 1010), machine learning module 150 performs a biometric match between the behavioral biometric metadata and the user profile using a trained machine learning model at 1014 (for example, according to principles previously described with reference to FIGS. 9A-9B).

In response to a positive biometric match ("YES" at decision block 1016), assessment module 148 generates a positive control signal at 1006. In response to a negative biometric match ("NO" at decision block 1016), assessment module 148 generates a negative control signal at 1012.

In some embodiments, biometric authentication platform 108 sends the positive or negative control signal to client platform 106. In response to receiving the positive control signal, client platform 106 authenticates the user and allows the user to log in to client platform 106. In response to receiving the negative control signal, client platform 106 rejects the user's login request and does not allow the user to log in to client platform 106.

Systems and methods described in this specification provide a variety of novel and inventive solutions to technical problems related to authenticating password reset requests and/or authenticating user login attempts. For example, authentication techniques described in this specification do not rely on users having access to external recovery phone numbers or email addresses, which may not be secure or up to date. Furthermore, authentication techniques (particularly techniques for authenticating user login attempts) do not require users to enter an exact match into the password field, which facilitates a seamless-yet-secure login process. Additionally, authentication techniques described in this specification are not susceptible to social engineering attempts or brute force attempts. Furthermore, authentication techniques described in this specification present a transparent user experience, are computationally lightweight, and may be performed in real time or near-real time.

Additionally, authentication techniques described in this specification improve computational efficiency and throughput. For example, systems that rely on email messages, short message service messages, and/or push notifications as part of their authentication processes generate and send cross-platform data packages for each authentication attempt. Because these messages and/or notifications tend to be time-limited and expire, multiple messages and/or notifications are often generated to authenticate a single login attempt. Such techniques can generate a high volume of additional cross-platform network traffic. By reducing or eliminating the need for such cross-platform network traffic, techniques described in this specification reduce or eliminate computational and data transmission requirements associated with the traffic, thereby improving computational efficiency and throughput.

Furthermore, by reducing or eliminating cross-platform network traffic, the number of points (or "surface areas") through which a malicious actor could potentially gain access to a computer system may be reduced. This reduction in the "attack surface" improves the overall security of the computer system. For example, when an email message is used in the password reset process, the malicious actor may target the user's email account in an attempt to intercept the email message. In such a scenario, the user's email account may be a vulnerable point through which the malicious actor may compromise the computer system. By eliminating the user's email account from the authentication process, the overall "attack surface" is reduced.

In some examples, biometric authentication platform 108 aggregates behavioral biometric metadata from the user's successful logins across a variety of platforms and/or a variety of graphical user interfaces. Thus, biometric matches for each subsequent transaction may be performed against a much more robust set of historical behavioral biometric data than historical behavioral biometric data generated at an individual platform level (or from the user's interactions with a single graphical user interface). Furthermore, because historical behavioral biometric metadata is continuously collected and updated every time the user successfully logs in to a platform (regardless of which device, software, or platform the user interacts with—or whether the device, software, or platform is new or different from those used in previous interactions), the historical behavioral biometric metadata is constantly being updated to incorporate the user's most up-to-date habits and patterns, and machine learning models may be continuously retrained using the most up-to-date data.

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more steps within any given method may be executed in a different order—or steps may be executed concurrently—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrates the flow of information—such as data or instructions. However, the direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element.

Throughout this application, the term "module" or the term "controller" may be replaced with the term "circuit." A "module" may refer to, be part of, or include processor hardware that executes code and memory hardware that stores code executed by the processor hardware. The term "module" may include one or more interference circuits. In various implementations, the interference circuits may implement wired or wireless interfaces that connect to or are part of communications systems. Modules may communicate with other modules using the interference circuits. In various implementations, the functionality of modules may be distributed among multiple modules that are connected via communications systems. For example, functionality may be distributed across multiple modules by a load balancing system. In various implementations, the functionality of modules may be split between multiple computing platforms connected by communications systems.

The term "code" may include software, firmware, and/or microcode, and may refer to programs, routines, functions, classes, data structures, and/or data objects. The term "memory hardware" may be a subset of the term "computer-readable medium." The term computer-readable medium does not encompass transitory electrical or electromagnetic signals or electromagnetic signals propagating through a medium—such as on an electromagnetic carrier wave. The term "computer-readable medium" is considered tangible and non-transitory. Modules, methods, and apparatuses described in this application may be partially or fully implemented by a special-purpose computer that is created by configuring a general-purpose computer to execute one or more particular functions described in computer programs. The functional blocks, flowchart elements, and message sequence charts described above serve as software specifications that can be translated into computer programs by the routine work of a skilled technician or programmer.

It should also be understood that although certain drawings illustrate hardware and software as being located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or they may be distributed among different computing devices—such as computing devices interconnected by one or more networks or other communications systems.

In the claims, if an apparatus or system is claimed as including an electronic processor or other element configured in a certain manner, the claim or claimed element should be interpreted as meaning one or more electronic processors (or other element as appropriate). If the electronic processor (or other element) is described as being configured to make one or more determinations or one or execute one or more steps, the claim should be interpreted to mean that any combination of the one or more electronic processors (or any combination of the one or more other elements) may be configured to execute any combination of the one or more determinations (or one or more steps).

What is claimed is:

1. A system including:
memory hardware configured to store instructions and
one or more electronic processors configured to execute
the instructions, wherein the instructions include:
logging historical behavioral biometric metadata from
one or more computing platforms;
generating a user profile based on the logged historical
behavioral biometric metadata;

receiving an authentication request from a client computing platform, wherein the authentication request includes first behavioral biometric metadata comprising keystroke dynamics features including a dwell time and a flight time;

providing the first behavioral biometric metadata and the user profile to a trained machine learning model to generate a biometric match;

generating a positive control signal in response to a positive biometric match;

sending the positive control signal to the client computing platform;

updating the historical behavioral biometric metadata with the first behavioral biometric metadata; and retraining the trained machine learning model using the updated historical behavioral biometric metadata.

2. The system of claim 1 wherein providing the first behavioral biometric metadata and the user profile to the trained machine learning model to generate the biometric match includes:

providing the user profile to the trained machine learning model to generate a reference output;

providing the first behavioral biometric metadata to the trained machine learning model to generate a first output; and computing a closeness of the reference output and the first output.

3. The system of claim 2 wherein the instructions include generating the positive biometric match in response to the closeness meeting or exceeding a threshold.

4. The system of claim 3 wherein the instructions include generating a negative biometric match in response to the closeness not meeting or exceeding the threshold.

5. The system of claim 1 wherein the client computing platform is configured to authenticate a password reset request from a user device in response to receiving the positive control signal.

6. The system of claim 1 wherein the client computing platform is configured to authenticate a login request from a user device in response to receiving the positive control signal.

7. A computer-implemented method including:

logging historical behavioral biometric metadata from one or more computing platforms;

generating a user profile based on the logged historical behavioral biometric metadata;

receiving an authentication request from a client computing platform, wherein the authentication request includes first behavioral biometric metadata comprising keystroke dynamics features including a dwell time and a flight time;

providing the first behavioral biometric metadata and the user profile to a trained machine learning model to generate a biometric match;

generating a positive control signal in response to a positive biometric match;

sending the positive control signal to the client computing platform;

updating the historical behavioral biometric metadata with the first behavioral biometric metadata; and retraining the trained machine learning model using the updated historical behavioral biometric metadata.

8. The method of claim 7 wherein providing the first behavioral biometric metadata and the user profile to the trained machine learning model to generate the biometric match includes:

providing the user profile to the trained machine learning model to generate a reference output;

providing the first behavioral biometric metadata to the trained machine learning model to generate a first output; and computing a closeness of the reference output and the first output.

9. The method of claim 8 further including generating the positive biometric match in response to the closeness meeting or exceeding a threshold.

10. The method of claim 9 further including generating a negative biometric match in response to the closeness not meeting or exceeding the threshold.

11. The method of claim 7 wherein the client computing platform is configured to authenticate a password reset request from a user device in response to receiving the positive control signal.

12. The method of claim 7 wherein the client computing platform is configured to authenticate a login request from a user device in response to receiving the positive control signal.

13. A system including:

memory hardware configured to store instructions and one or more electronic processors configured to execute the instructions, wherein the instructions include:

logging historical behavioral biometric metadata from one or more computing platforms, generating a user profile based on the logged historical behavioral biometric metadata, receiving an authentication request from a client computing platform, wherein the authentication request includes first behavioral biometric metadata, wherein the first behavioral biometric metadata includes keystroke metadata, wherein the keystroke metadata includes keystroke dynamics metadata, and wherein the keystroke dynamics metadata includes a dwell time and a flight time, providing the first behavioral biometric metadata and the user profile to a trained machine learning model to generate a biometric match, generating a positive control signal in response to a positive biometric match, sending the positive control signal to the client computing platform;

updating the historical behavioral biometric metadata with the first behavioral biometric metadata; and retraining the trained machine learning model using the updated historical behavioral biometric metadata.

* * * * *